United States Patent [19]
Leonard

[11] Patent Number: 5,300,273
[45] Date of Patent: Apr. 5, 1994

[54] PROCESS FOR PRODUCING A VAPOR MIXTURE OF TITANIUM TETRACHLORIDE AND ALUMINUM TRICHLORIDE

[75] Inventor: Robert E. Leonard, Oklahoma City, Okla.

[73] Assignee: Kerr-McGee Chemical Corporation, Oklahoma City, Okla.

[21] Appl. No.: 985,526

[22] Filed: Dec. 3, 1992

Related U.S. Application Data

[63] Continuation of Ser. No. 745,680, Aug. 16, 1991, abandoned.

[51] Int. Cl.⁵ .................. C01G 23/02; C01F 7/48
[52] U.S. Cl. .................. 423/492; 423/495; 423/612; 423/658.3; 423/613
[58] Field of Search .............. 423/492, 495, 613, 614, 423/658.5, 612; 106/437, 442

[56] References Cited

U.S. PATENT DOCUMENTS

| | | | |
|---|---|---|---|
| 2,437,171 | 3/1948 | Pechukas | 106/300 |
| 2,441,225 | 5/1948 | Pechukas | 106/300 |
| 2,689,781 | 9/1954 | Schaumann | 23/202 |
| 2,790,704 | 4/1957 | Lewis | 23/87 |
| 2,824,050 | 2/1958 | Marcot et al. | 202/57 |
| 3,036,926 | 5/1962 | Hughes | 106/300 |
| 3,340,008 | 9/1967 | Nelson et al. | 23/202 |
| 3,446,579 | 5/1969 | Toomey et al. | 23/93 |
| 3,511,618 | 5/1970 | Michaud et al. | 23/293 |
| 3,524,818 | 8/1970 | Bramekamp et al. | 252/188.3 |
| 4,246,239 | 1/1981 | Dewey et al. | 423/132 |
| 4,929,381 | 5/1990 | Clark | 252/174.25 |

Primary Examiner—Benjamin R. Fuller
Assistant Examiner—Valerie Ann Lund
Attorney, Agent, or Firm—Herbert M. Hanegan

[57] ABSTRACT

An improved process is provided for producing titanium tetrachloride vapor admixed with a desired particular amount of aluminum trichloride vapor for use in the production of rutile titanium dioxide. The vapor mixture is derived from a titanium tetrachloride solution containing the desired particular amount of aluminum trichloride. The solution is produced continuously by dissolving aluminum trichloride in a heated stream of liquid titanium tetrachloride utilizing a cyclic aluminum trichloride bed switching and recharging process.

22 Claims, 4 Drawing Sheets

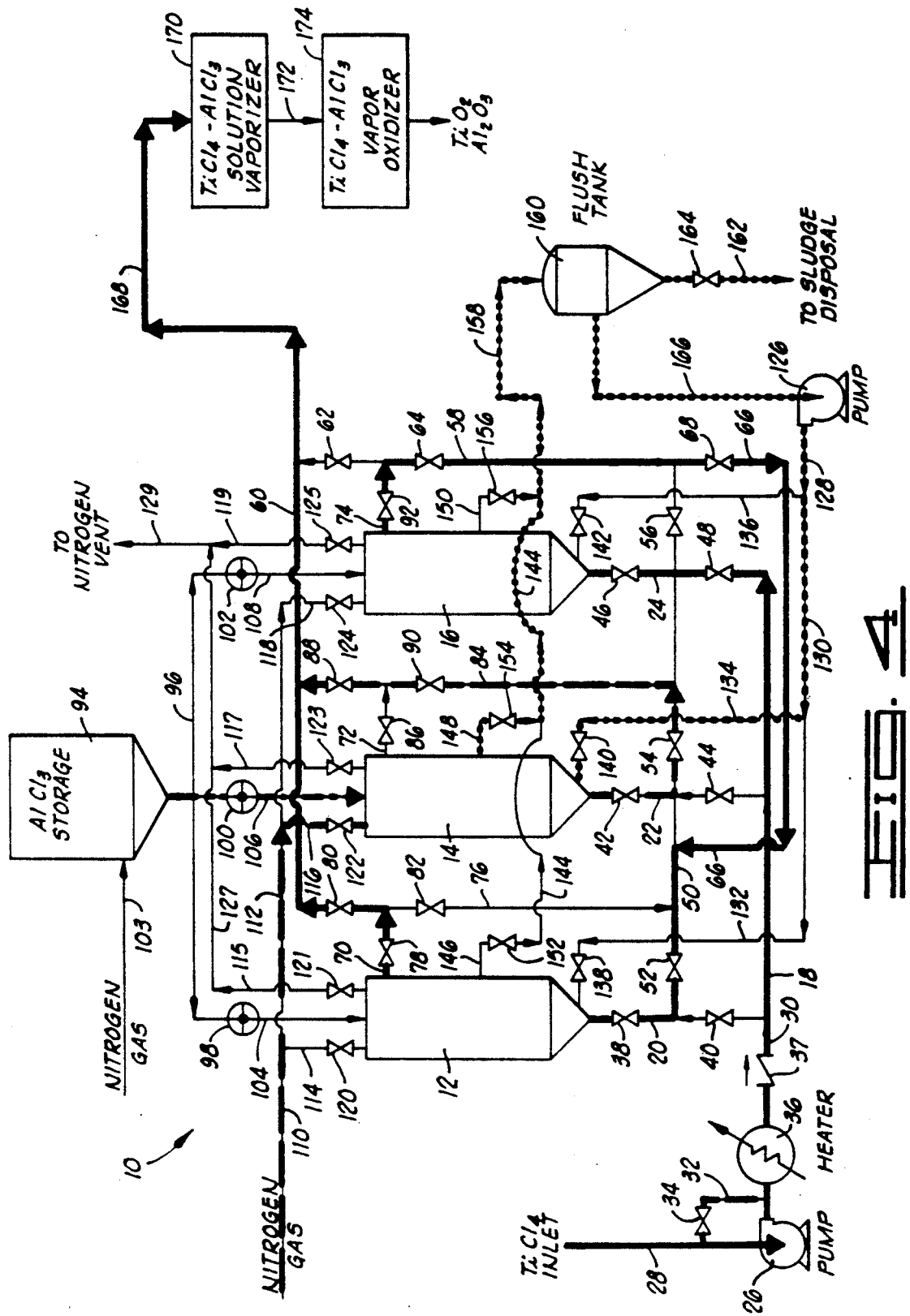

PROCESS FOR PRODUCING A VAPOR MIXTURE OF TITANIUM TETRACHLORIDE AND ALUMINUM TRICHLORIDE

This application is a continuation of application Ser. No. 07/745,680, filed Aug. 16, 1991 now abandoned.

BACKGROUND OF THE INVENTION

1. Field of the Invention

The present invention relates to a process for continuously producing a solution of titanium tetrachloride and aluminum trichloride which when evaporated produces a vapor mixture containing a desired particular amount of aluminum trichloride for use in producing rutile titanium dioxide pigment.

2. Description of the Prior Art

The production of rutile titanium dioxide pigment by the oxidation of titanium tetrachloride admixed with a minor amount of aluminum trioxide is well known. The vapor mixture is generally combined with oxygen in a burner wherein the oxidation of the titanium tetrachloride to titanium dioxide takes place. It is necessary to incorporate a minor amount of aluminum trichloride vapor with the titanium tetrachloride vapor to insure the desired rutile crystalline form of titanium dioxide is produced and to improve the weatherability of the titanium dioxide product.

In order to obtain a rutile titanium dioxide of uniform quality, it is necessary to maintain a constant ratio of aluminum compound and titanium tetrachloride in the vapor mixture which is oxidized. A variety of techniques have been developed and used heretofore for producing such vapor mixtures. Examples of the techniques include adding metallic aluminum powder to a mixture of vaporous titanium tetrachloride and oxygen, spraying molten aluminum into a mixture of vaporous titanium tetrachloride and oxygen, passing liquid titanium tetrachloride together with oxygen and an inert gas through solid aluminum trichloride in an evaporator, passing a carrier gas stream of vaporous titanium tetrachloride and oxygen through a fluidized bed of aluminum trichloride, evaporating titanium tetrachloride and aluminum trichloride separately and then combining them in the desired ratio, passing vaporized titanium tetrachloride and chlorine through a bed of aluminum metal particles or a fluidized bed of aluminum powder, and many others.

U.S. Pat. No. 2,824,050 issued Feb. 18, 1958 discloses a process wherein aluminum trichloride is dissolved in hot liquid titanium tetrachloride and the solution is evaporated after removal of non-volatile precipitates produced. The process includes dissolving 0.1% to 5% of the aluminum trichloride in the titanium tetrachloride, distilling the mixture, condensing and combining the distillate, and continuously flash vaporizing the distillate.

Even though a variety of the foregoing and other prior art techniques have been utilized successfully, all have involved the use of relatively expensive equipment, and generally, they have not been consistent in producing a constant ratio of titanium tetrachloride to aluminum compound.

U.S. Pat. No. 3,524,818 issued Aug. 18, 1970 discloses a method which is stated to be relatively simple, inexpensive and continuous for producing a stream of vaporous titanium tetrachloride containing an exact amount of vaporous aluminum trichloride. The method comprises the steps of dissolving the aluminum trichloride in a suitable anhydrous organic or inorganic liquid, and simultaneously feeding a stream of the resulting solution and a separate stream of liquid titanium tetrachloride to an evaporator in controlled amounts whereby both streams are evaporated simultaneously. Examples of solvents which can be used are ethers, alcohols and thionylchloride. Thus, the method involves the use of a solvent which does not enter into the titanium dioxide production reaction, which adds expense to the method and which presents a solvent recovery or disposal problem.

In more recent processes for producing rutile titanium dioxide pigment, aluminum trichloride is dissolved in hot titanium tetrachloride, and the resulting solution is fed to vaporizers which simultaneously vaporize both the aluminum trichloride and titanium tetrachloride to provide a vapor mixture having the desired particular aluminum trichloride content. The vapor mixture is then oxidized in an oxidizer apparatus to produce the rutile titanium dioxide pigment. The vaporizer and oxidizer apparatus must be operated at super atmospheric pressures which makes it difficult to pump the hot highly corrosive titanium tetrachloride-aluminum trichloride solution into the vaporizer apparatus. In order to avoid the pumping difficulties, the vaporizer apparatus has often been fed from an elevated feed tank, and the overall process of producing the titanium tetrachloride-aluminum trichloride solution has still been expensive to carry out. Thus, there is a need for an improved less expensive process for producing a continuous stream of titanium tetrachloride solution containing a desired particular amount of aluminum trichloride which can be vaporized and then utilized as a feed to titanium dioxide producing oxidizer apparatus.

SUMMARY OF THE INVENTION

The present invention fulfills the need mentioned above by providing an improved process for producing a stream of titanium tetrachloride solution containing a desired particular amount of aluminum trichloride and for producing a vapor mixture thereof. The process obviates the need to pump the highly corrosive titanium tetrachloride-aluminum trichloride solution formed and the process is reliable and relatively inexpensive to carry out.

The process of the present invention for producing a stream of titanium tetrachloride solution containing a desired particular amount of aluminum trichloride, which solution is subsequently vaporized and oxidized to form rutile titanium dioxide pigment comprises the first step of heating an inlet stream of liquid titanium tetrachloride to a temperature at which the stream, when saturated with dissolved aluminum trichloride, contains aluminum trichloride in the desired particular amount. The heated titanium tetrachloride stream is then flowed into contact with at least one bed of granular aluminum trichloride whereby aluminum trichloride is dissolved in the titanium tetrachloride to saturation and an outlet stream of titanium tetrachloride solution containing the desired particular amount of aluminum trichloride is produced.

While the bed of granular aluminum trichloride is contacted with the heated titanium tetrachloride stream, a depleted bed is recharged with granular aluminum trichloride. That is, a depleted bed of solid aluminum trichloride from which a major portion of the aluminum trichloride has previously been removed by dissolution in the heated stream of liquid titanium tetrachloride is removed from contact with the heated stream of liquid titanium tetrachloride. While removed from such contact, liquid titanium tetrachloride is drained from the bed, the bed is filled with fresh granular aluminum trichloride, the bed is refilled with liquid titanium tetrachloride, and then the bed is preheated preparatory to again being contacted with the heated stream of liquid titanium tetrachloride.

When a major portion of the bed of granular aluminum trichloride being contacted with the heated titanium tetrachloride stream has been removed by dissolution in the stream, the flow pattern of the heated stream of liquid titanium tetrachloride is changed so that it flows into contact with the just recharged bed of granular aluminum trichloride. The depleted bed just contacted with the heated titanium tetrachloride stream is simultaneously taken out of contact with the stream and is recharged.

Thereafter, the flow pattern of the heated stream of liquid titanium tetrachloride is periodically changed so that it flows into contact with the bed of granular aluminum trichloride just recharged. The depleted bed from which a major portion of the granular aluminum trichloride has just been removed is removed from contact with the heated stream of liquid titanium tetrachloride and recharged.

In a presently preferred embodiment of the present invention, the heated stream of titanium tetrachloride is serially flowed into contact with first and second beds of granular aluminum trichloride while a third bed is being recharged. The flow pattern of the heated titanium tetrachloride stream is changed when a major portion of the first bed of granular aluminum trichloride has been removed by dissolution in the stream so that the stream serially flows into contact with the second and third beds of granular aluminum trichloride and the first depleted bed is no longer in contact with the stream and is recharged. Thereafter, the flow pattern of the heated stream of titanium tetrachloride is changed so that the stream serially flows into contact with the bed of granular aluminum chloride previously contacted last by the stream and then into contact with the bed just recharged, and so that the depleted bed from which a major portion of the granular aluminum trichloride has just been removed by dissolution is no longer in contact with the stream and is recharged.

The process of this invention produces a continuous stream of titanium tetrachloride solution containing the desired particular amount of aluminum trichloride. Only the feed stream of liquid titanium tetrachloride is pumped, and the solution of titanium tetrachloride and aluminum trichloride formed is continuously conducted to a vaporizer wherein it is vaporized. The resulting vapor mixture which also contains the desired particular amount of aluminum trichloride is conducted to an oxidizer wherein the titanium and aluminum chloride compounds are oxidized and rutile titanium dioxide pigment is produced.

It is, therefore, a general object of the present invention to provide an improved process for producing a vapor mixture of titanium tetrachloride and aluminum trichloride for use as a feed stream to an oxidizer wherein rutile titanium dioxide pigment is produced therefrom.

A further object of the present invention is the provision of a process for producing a continuous stream of titanium tetrachloride solution containing a desired particular amount of aluminum trichloride which is reliable and relatively inexpensive to operate.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

FIG. 4 is a schematic illustration similar to FIG. 1, but showing the system in a third mode of operation.

DESCRIPTION OF PREFERRED EMBODIMENTS

The process of the present invention utilizes at least two and preferably three separate beds containing granular aluminum trichloride. A stream of heated liquid titanium tetrachloride contacts at least one bed, and preferably two of the beds in series, whereby a desired particular amount of aluminum trichloride is dissolved in the liquid titanium tetrachloride. The resulting stream of titanium tetrachloride solution containing the aluminum trichloride is conducted to a vaporizer wherein the stream is converted to a vapor mixture and then to an oxidizer wherein the titanium and aluminum chloride compounds are converted to rutile titanium dioxide and aluminum oxide. While the aluminum trichloride bed or beds are being contacted and dissolved by the heated titanium tetrachloride stream, a depleted bed is being recharged, i.e., replenished with fresh aluminum trichloride. The flow pattern of the heated titanium tetrachloride stream is periodically changed whereby the depleted bed previously contacted by the stream and from which a major portion of the granular aluminum trichloride has been removed is recharged and the bed just recharged is contacted by the stream. In the preferred process where three beds are used, the flow pattern of the heated stream of liquid titanium tetrachloride is periodically changed whereby the bed previously contacted last by the stream is contacted first thereby, the bed just recharged is contacted last by the stream, and the depleted bed previously contacted first by the stream and from which a major portion of the granular aluminum trichloride has been removed is recharged.

Figure 1:
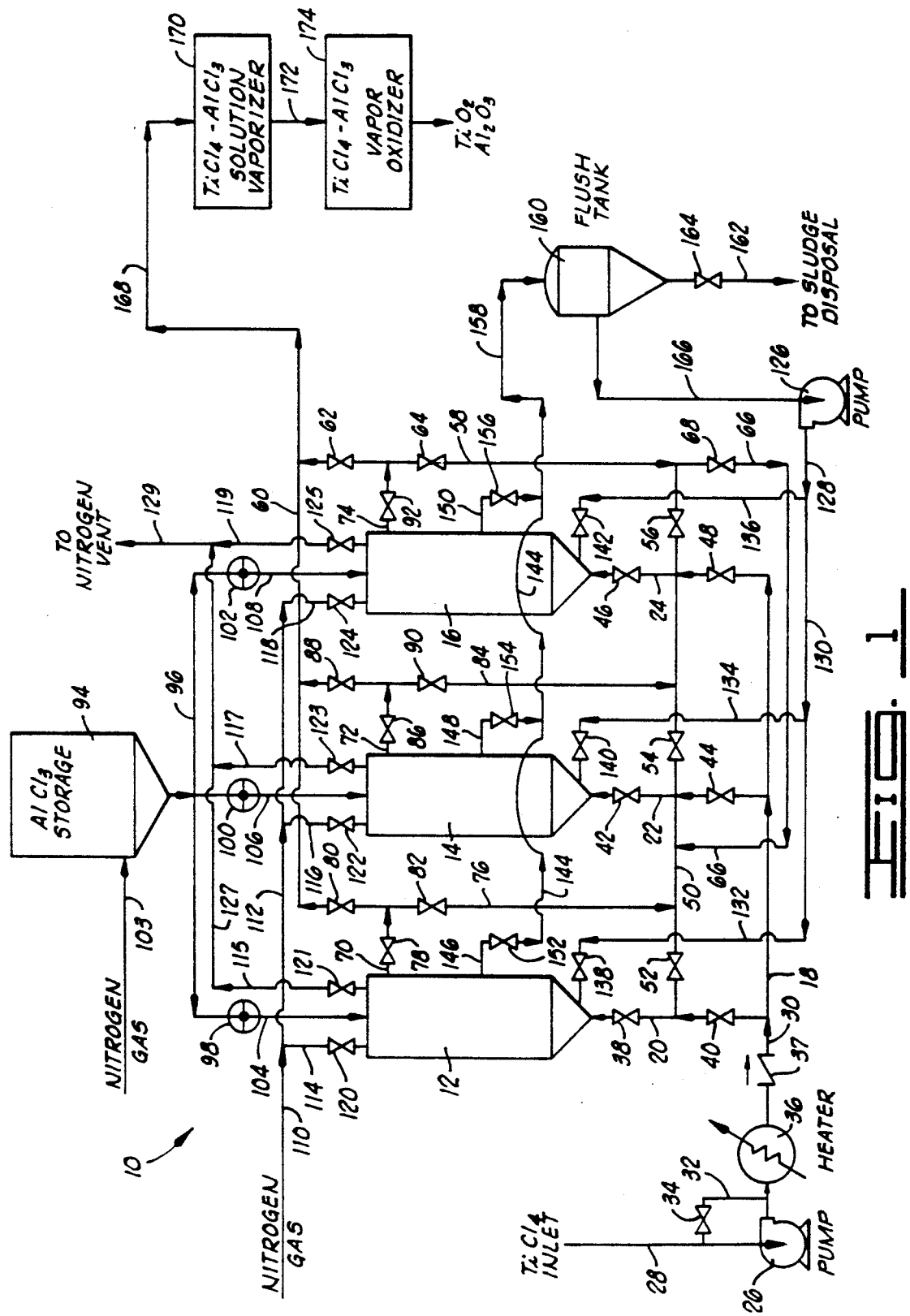
FIG. 1 is a schematic illustration of a system of apparatus for carrying out the process of the present invention.

Referring now to the drawings, and particularly to FIG. 1, a system for carrying out the improved process of the present invention is illustrated and generally designated by the numeral 10. The system 10 is basically comprised of three closed vessels 12, 14 and 16 each of which contains a bed of granular aluminum trichloride. The vessels 12, 14 and 16 are preferably glass lined, steel vessels with conical bottoms. Means for diffusing and distributing incoming liquid feed to the vessels (not shown) are disposed within the conical bottom sections thereof, and means for heating the vessels such as steam jacketing (not shown) are also provided.

Each of the vessels 12, 14 and 16 include inlet connections at the apexes of the conical bottoms thereof which are connected to a heated liquid titanium tetrachloride inlet header 18 by conduits 20, 22 and 24, respectively.

A liquid titanium chloride pump 26 is provided, the inlet of which is connected by a conduit 28 to a source of liquid titanium tetrachloride such as storage facilities. The discharge of the pump 26 is connected by a conduit 30 to the inlet header 18. A bypass conduit 32 is provided around the pump 26 and a shut-off valve 34 is disposed therein. A liquid titanium tetrachloride heater 36, such as a heating medium, e.g., steam, heat exchanger, is disposed in the conduit 30 for heating the stream of liquid titanium tetrachloride pumped by the pump 26. A check valve 37 for preventing backflow in the conduit 30 is also disposed therein. A pair of valves are disposed in each of the conduits 20, 22 and 24. That is, valves 38 and 40 are disposed in the conduit 20, valves 42 and 44 are disposed in the conduit 22 and valves 46 and 48 are disposed in the conduit 24. A second header 50 is connected to the conduits 20, 22 and 24 between the valves disposed therein. That is, the header 50 is connected to the conduit 20 between the valves 38 and 40, to the conduit 22 between the valves 42 and 44 and to the conduit 24 between the valves 46 and 48. Valves 52, 54 and 56 are disposed in the header 50 adjacent each of the connections of the header 50 to the conduits 20, 22 and 24. The header 50 is connected to a conduit 58 which is in turn connected to a product stream outlet header 60. Valves 62 and 64 are disposed in the conduit 58. A conduit 66 is connected at one end to the header 50 adjacent the side of the valve 56 opposite the conduit 24 and at the other end to the header 50 between the conduit 22 and the valve 52. A valve 68 is disposed in the conduit 66.

Each of the vessels, 12, 14 and 16 includes an outlet connection near the top thereof having conduits 70, 72 and 74 connected thereto, respectively. The conduit 70 is connected to a conduit 76 and a valve 78 is disposed in the conduit 70. Valves 80 and 82 are disposed in the conduit 76 on opposite sides of the point at which the conduit 70 is connected to the conduit 76. The upper end of the conduit 76 is connected to the product outlet header 60 and the lower end of the conduit 76 is connected to the header 50. The conduit 72 is connected to a conduit 84 and a valve 86 is disposed in the conduit 72. A pair of valves 88 and 90 are disposed in the conduit 84 on opposite sides of the point at which the conduit 72 is connected thereto. The upper end of the conduit 84 is connected to the product outlet header 60 and the lower end is connected to the header 50. The conduit 74 is connected to the conduit 58 between the valves 62 and 64 therein and a valve 92 is disposed in the conduit 74.

A storage vessel 94 containing a supply of fresh aluminum trichloride is provided, the outlet of which is connected to a conveyor 96. The conveyor 96 is in turn connected to three conventional rotary valves 98, 100 and 102. The rotary valve 98 is connected to an aluminum trichloride inlet connection in the vessel 12 by a conduit 104, the rotary valve 100 is connected to an inlet in the vessel 14 by a conduit 106 and the rotary valve 102 is connected to an inlet connection in the vessel 16 by a conduit 108. Pressurized nitrogen purge gas is conducted from a source thereof (not shown) to an inlet connection in the vessel 94 by a conduit 103 connected therebetween.

A conduit 110 conducts a stream of pressurized nitrogen gas from a second source thereof (not shown) at a lower pressure to an inlet header 112. The inlet header 112 is connected to inlet connections in the vessels 12, 14 and 16 by conduits 114, 116 and 118, respectively, and valves 120, 122 and 124 are disposed in the conduits 114, 116 and 188, respectively. Nitrogen containing titanium tetrachloride vapor is displaced from the vessels 12, 14 and 16 by way of outlet connections therein connected to conduits 115, 117 and 119, respectively, and valves 121, 123 and 125 disposed in the conduits. The conduits 115, 117 and 119 are connected to a header 127 which is in turn connected to a conduit 129. The conduit 129 conducts the nitrogen to a nitrogen vent system wherein the nitrogen containing titanium tetrachloride vapor is disposed of or processed.

A pump 126 is provided for pumping a side stream of liquid titanium tetrachloride, the discharge connection of which is connected by a conduit 128 to an inlet header 130. The header 130 is connected to inlet connections in the vessels 12, 14 and 16 by conduits 132, 134 and 136, respectively. The conduits 132, 134 and 136 have valves 138, 140 and 142 disposed therein, respectively. A side stream outlet header 144 is provided which is connected to outlets in the vessels 12, 14 and 16 by conduits 146, 148 and 150, respectively. The conduits 146, 148 and 150 have valves 152, 154 and 156 disposed therein, respectively. The header 144 is connected by a conduit 158 to the inlet of a sludge accumulating flush tank 160. A sludge outlet in the tank 160 is connected by a conduit 162 to a sludge disposal location, and the conduit 162 has a valve 164 disposed therein. An outlet connection in the tank 160 is connected by a conduit 166 to the inlet connection of the pump 126.

The product stream entering the outlet header 60, i.e., a continuous stream of liquid titanium tetrachloride solution containing a desired particular amount of aluminum trichloride is conducted by a conduit 168 connected to the header 60 to a vaporizer apparatus 170. While flowing through the vaporizer 170, the solution is converted to a vapor mixture. The vapor mixture is then conducted by a conduit 172 to an oxidizer apparatus 174 wherein the vapor mixture is converted to rutile titanium dioxide containing a minor amount of aluminum oxide.

Operation of the Apparatus 10

As will be described in detail hereinbelow, the system 10 is sequentially operated so that a continuous stream of liquid titanium tetrachloride dissolves aluminum trichloride, and a continuous outlet stream of titanium tetrachloride solution containing a desired particular amount of aluminum trichloride is produced. The inlet stream of liquid titanium tetrachloride is heated to a temperature at which the stream, when saturated with dissolved aluminum trichloride, contains the desired particular amount of aluminum trichloride. The heated stream of liquid titanium tetrachloride is then caused to flow into contact with first and second beds of granular aluminum trichloride in series. Aluminum trichloride is dissolved in the heated liquid titanium tetrachloride to saturation, and the outlet stream contains the desired particular amount of aluminum trichloride. During the time the first and second beds of aluminum trichloride are being contacted with the heated stream of liquid titanium tetrachloride, a third depleted bed which was previously contacted with the heated titanium tetrachloride stream whereby a major portion of the aluminum trichloride contained in the bed was removed is recharged. The recharging of the third bed which is removed from contact with the stream of liquid titanium tetrachloride, involves draining liquid titanium tetrachloride remaining in the bed therefrom, filling the bed with fresh granular aluminum trichloride, refilling the bed with liquid titanium tetrachloride and preheating the bed and liquid titanium tetrachloride contained therein. Also, sludge is periodically removed from the beds during recharging by flushing the beds with a side stream of liquid titanium tetrachloride and separating sludge from the side stream.

When a major portion of the granular aluminum trichloride contained in the first bed is removed therefrom by dissolution in the heated stream of liquid titanium trichloride flowing therethrough, the flow pattern of the heated stream of liquid titanium tetrachloride is changed so that it serially flows into contact with the second and third beds of granular aluminum trichloride and the first bed is removed from contact therewith. During the time that the second and third beds are in contact with the heated stream of liquid titanium tetrachloride, the first bed is recharged in the manner described above.

Thereafter, the flow pattern of the heated stream of liquid titanium tetrachloride is periodically changed so that it serially flows into contact with the bed of granular aluminum trichloride previously contacted last thereby and then into contact with the bed of granular aluminum trichloride just recharged. The bed from which a major portion of the granular aluminum trichloride has just been removed by dissolution, i.e., the bed previously contacted first by the heated stream of liquid titanium tetrachloride, is removed from contact with the stream and is recharged.

Thus, the beds of aluminum trichloride are continuously contacted by a heated stream of liquid titanium tetrachloride whereby the stream dissolves a desired particular amount of aluminum trichloride, and the beds are continuously recharged by removing sludge therefrom and replacing dissolved aluminum trichloride with fresh granular aluminum trichloride.

The operation of the valves for changing the flow pattern of the heated stream of liquid titanium tetrachloride and for recharging the bed not in contact with the stream of titanium tetrachloride are preferably accomplished automatically utilizing conventional instruments and controls. That is, the valves can be controlled by a time cycle controller or the like whereby the flow patterns of the various streams flowing through the system 10 are sequentially switched. Preferably, the switching of the valves is accomplished by a controller triggered by aluminum chloride level sensing devices which sense the level of aluminum chloride remaining in the first bed in the series of two beds being contacted by the heated stream of liquid titanium tetrachloride. When a major portion of the aluminum trichloride has been removed by dissolution from the first bed of the two beds being serially contacted by the liquid stream of heated titanium tetrachloride, the flow pattern of the heated stream of liquid titanium tetrachloride as well as the flow patterns of the other process streams involved in the recharging of the beds are changed by operation of the various switching valves.

The flow patterns of the various streams in the system 10 are the same in the fourth mode of operation as they were in the first mode of operation. Stated another way, the heated stream of liquid titanium tetrachloride is continuously cycled through three separate flow patterns which are continuously repeated. During each flow pattern or mode of operation, the stream of liquid titanium tetrachloride contacts two of the beds of aluminum trichloride in series while a third is being recharged.

Figure 2:
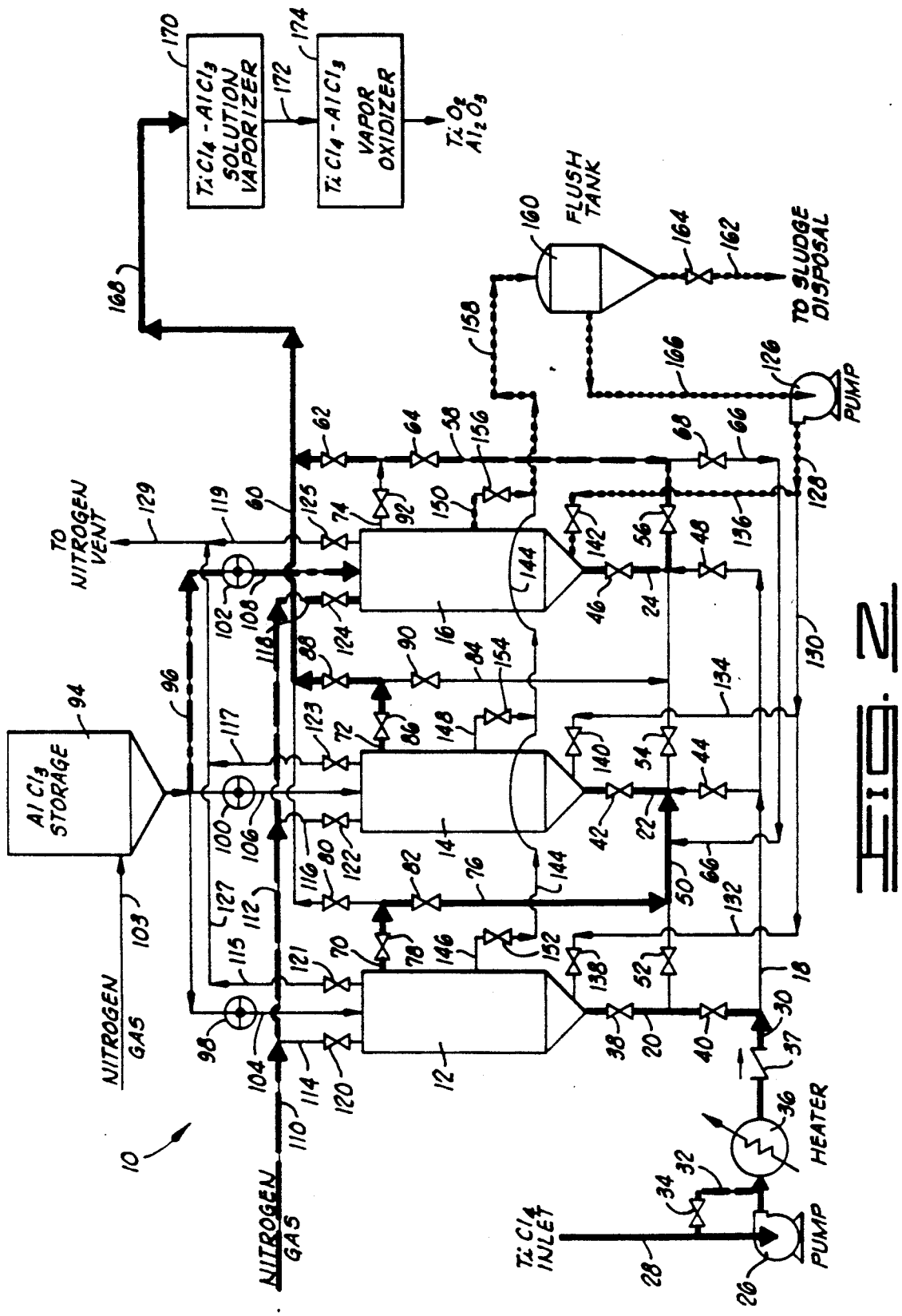
FIG. 2 is a schematic illustration similar to FIG. 1, but showing the system in a first mode of operation.

Referring now to FIG. 2, the first mode of operation of the system 10 is illustrated. That is, the flow pattern of the heated stream of liquid titanium tetrachloride through the system 10 is shown by heavy solid lines, the flow pattern of the pressurized nitrogen gas and liquid titanium tetrachloride solution displaced thereby are shown by heavy dashed lines, the flow pattern of the fresh aluminum trichloride added to the beds is shown by lines of alternating heavy dashes and dots and the flow pattern of the sludge removal side stream is shown by dotted lines. The same method of showing the various flow patterns is utilized in FIGS. 3 and 4.

Still referring to FIG. 2, during the first mode of operation of the system 10, a stream of liquid titanium tetrachloride is pumped from the source thereof by way of the conduit 28 to the inlet connection of the pump 26. The operation of the pump 26 is controlled utilizing conventional instruments to produce a stream of liquid titanium tetrachloride at a selected flow rate and at a pressure sufficient to overcome the pressure drop in the stream incurred as a result of flowing through the system 10, the solution vaporizer 170 and the vapor oxidizer 174. Generally, the stream of liquid titanium tetrachloride exits the pump 26 at a pressure level in the range of from about 20 psig to about 40 psig. From the discharge of the pump 26, the stream of liquid titanium tetrachloride flows through the heater 36 wherein it is heated to a temperature at which the stream, when saturated with dissolved aluminum trichloride, contains the desired particular amount of aluminum trichloride. Generally, the stream is heated to a temperature in the range of from about 95° C. to about 130° C. whereby when saturated with dissolved aluminum trichloride, the stream contains aluminum trichloride in an amount in the range of from about 0.4% to about 4.0% by weight of the solution. Preferably, the stream of liquid titanium tetrachloride is heated to a temperature of about 108° C. whereby when it becomes saturated with dissolved aluminum trichloride it contains about 1% of aluminum trichloride by weight of the resulting solution.

From the heater 36, the heated stream of liquid titanium tetrachloride flows by way of the conduit 30, the conduit 20, and open valves 38 and 40 into the vessel 12 which contains a first bed of granular aluminum trichloride. As mentioned above, the vessels 12, 14 and 16 include means for distributing the incoming heated stream of titanium tetrachloride over the cross-section of the bed contained within the vessel 12. In addition, the flow rate of the heated stream of titanium tetrachloride entering and flowing through the beds of aluminum trichloride is controlled at a rate such that the aluminum trichloride dissolves uniformly in the stream without generating excess fines. As the aluminum trichloride is dissolved, the particles thereof uniformly decrease in size so that the bed of granular aluminum trichloride shrinks with time.

The resulting stream of liquid titanium tetrachloride containing dissolved aluminum trichloride produced within the vessel 12 is withdrawn therefrom by way of the conduit 70 and the open valve 78 therein. The stream is conducted by the conduit 76 by way of the open valve 82 therein and the conduit 22 by way of the open valve 42 therein to the inlet of the vessel 14. The vessel 14 contains the bed of aluminum trichloride which has just been recharged thereby insuring that the stream of liquid titanium tetrachloride reaches saturation before exiting the vessel 14 by way of the conduit 72 connected thereto and the open valve 86 therein. Thus, because the stream of liquid titanium tetrachloride was heated in the heater 36 to the temperature at which the stream, when saturated with dissolved aluminum trichloride contains the desired amount of aluminum trichloride, the saturated stream exiting the vessel 14 contains such desired amount of aluminum trichloride. The resulting titanium tetrachloride solution is conducted by the conduit 84 by way of the open valve 88 disposed therein to the product stream outlet header 60. From the outlet header 60, the solution is conducted by the conduit 168 to the solution vaporizer apparatus 170 wherein the solution is vaporized and a vapor mixture containing the same ratio of components produced. From the vaporizer 170, the vapor mixture is conducted by the conduit 172 to the vapor oxidizer apparatus 174 wherein rutile titanium dioxide containing aluminum oxide is produced.

During the time that the first and second beds of aluminum trichloride within the vessels 12 and 14 are being contacted with the heated stream of liquid titanium tetrachloride as described above, a third bed of aluminum trichloride from which a major portion of the aluminum trichloride has previously been removed by dissolution in the heated stream of liquid titanium tetrachloride is recharged. The recharging process involves the first step of circulating a side stream of the saturated liquid titanium tetrachloride remaining in the vessel 16 from the vessel 16, through the flush tank 160 and back into the vessel 16 whereby sludge is removed therefrom. That is, as shown by the dotted lines the pump 126 is operated which causes a side stream of the liquid titanium tetrachloride to flow from the vessel 16 by way of the conduit 150, the open shut-off valve 126 therein, the header 144 and the conduit 158 to the flush tank 160. While flowing through the flush tank 160, sludge carried with the stream of liquid titanium tetrachloride is separated therefrom. A substantially sludge-free stream is withdrawn from the flush tank 160 by way of the conduit 166 connected to the suction connection of the pump 126. From the discharge of the pump 126, the stream flows by way of the conduit 128, the header 130, the conduit 136 and the valve 142 back into the vessel 16. The circulation of the side stream is continued for a period of time sufficient to remove at least a major portion of the sludge accumulated in the vessel 16. Upon termination of the circulation, and after settling, sludge which has accumulated in the flush tank 160 is flushed therefrom by opening the valve 164 disposed in the conduit 162 whereby the sludge is conducted to a location of sludge disposal.

After the sludge removal sequence has taken place, saturated liquid titanium tetrachloride remaining within the vessel 16 is drained therefrom. This is accomplished by displacing the liquid titanium tetrachloride from the vessel 16 with pressurized nitrogen gas and conducting the displaced stream to the product outlet header 60 from where it is conducted to the solution vaporizer apparatus 170 and vapor oxidizer apparatus 174. More specifically, as shown by the dashed lines a stream of pressurized nitrogen gas is conducted from a source thereof by way of the conduit 110 to the header 112. From the header 112 the nitrogen stream flows by way of the conduit 118 and the open valve 124 into the top of the vessel 16. The flow of pressurized nitrogen gas into the vessel 16 causes the displacement of saturated liquid titanium tetrachloride from the vessel 16 by way of the conduit 24, the open valve 46, the header 50, the open valve 56 therein, the conduit 58 and the open valves 62 and 64 therein to the product outlet header 60 and to the vaporizer 170. As the vessel 16 is being drained, the pump 26 is at least partially bypassed by way of the bypass conduit 32 and valve 34. The rate of displacement of the saturated liquid titanium tetrachloride from the vessel 16 is controlled at a flow rate which when combined with the flow rate of saturated liquid titanium tetrachloride resulting from the liquid titanium tetrachloride pumped by the pump 26, a continuous stream of saturated titanium tetrachloride at a constant flow rate is conducted to the vaporizer apparatus 170.

If desired and in order to flush any sludge remaining in the vessel 16 into the other vessels, the saturated liquid titanium tetrachloride remaining in the vessel 16 can be displaced into and through the vessels 12 and 14. That is, the displaced liquid titanium tetrachloride can be caused to flow by way of the conduit 24, the open valve 48 therein and the conduit 18 to the conduit 20. The displaced liquid and any sludge therein combines with the inlet stream of heated titanium tetrachloride and the combined stream serially flows through the vessels 12 and 14. The sludge remains in one or both of the vessels and is removed therefrom during subsequent operations.

Upon completion of the draining sequence and as shown by lines of alternating dashes and dots, the bed within the vessel 16 is filled with fresh granular aluminum trichloride from the storage vessel 94 by way of the conveyor 96, the rotary valve 102 and the conduit 108. Since the storage vessel 94 contains pressurized nitrogen gas at a higher pressure than that in the vessel 16, nitrogen gas containing titanium tetrachloride vapor does not flow from the vessel 16 to the storage vessel 94 during the aluminum trichloride filling step. When the bed is replenished, the vessel 16 is refilled with liquid titanium chloride. That is, the valve 54 in the header 50 is opened and the flow pumped by the pump 26 is simultaneously increased whereby a side stream of liquid titanium tetrachloride flows through the header 50 and into the vessel 16 by way of the conduit 24 and open valve 46 therein. As the vessel 16 fills, nitrogen containing titanium tetrachloride vapor is displaced therefrom by way of the valve 125, the conduit 119, the header 127 and the conduit 129. Once the vessel 16 has been refilled with liquid titanium tetrachloride, the recharging process is completed by heating the vessel, the bed of granular aluminum trichloride and the liquid titanium tetrachloride therewithin. The heating is accomplished with steam jacketing provided on the vessel 16. The heating is controlled so that the bed and liquid titanium tetrachloride within the vessel reach the temperature at which the liquid titanium tetrachloride contain the desired saturation amount of aluminum trichloride prior to the next mode of operation.

Figure 3:
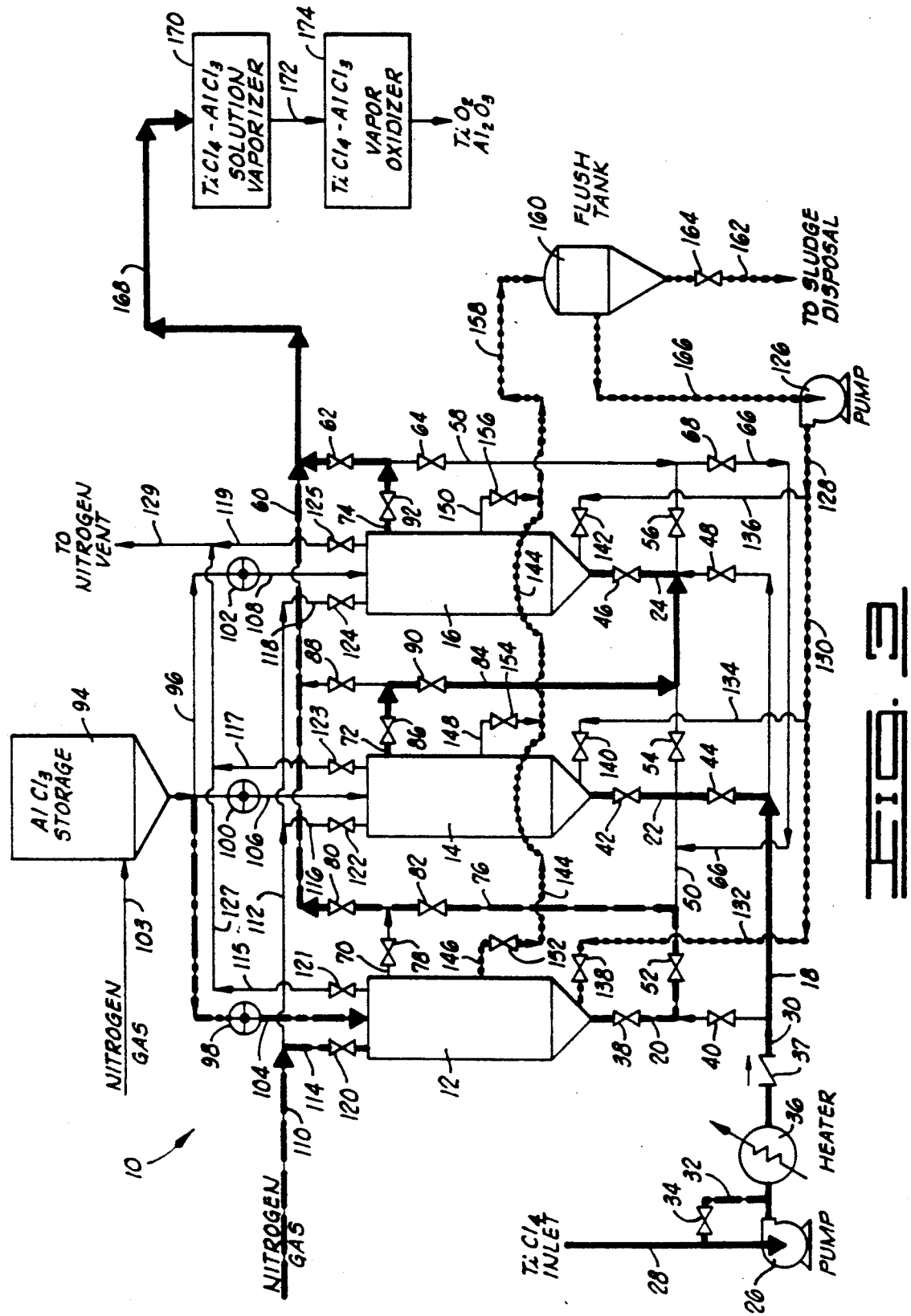
FIG. 3 is a schematic illustration similar to FIG. 1, but showing the system in a second mode of operation.

Referring now to FIG. 3, the second mode of operation of the system 10 is illustrated. As shown by the solid heavy lines, the various valves are switched such that the heated stream of liquid titanium tetrachloride is conducted by way of the header 18 to the conduit 22 and open valves 42 and 44 therein to the second bed of granular aluminum trichloride within the vessel 14. The stream of liquid titanium tetrachloride flows through the second bed of aluminum trichloride, exits the vessel 14 and is conducted to the third bed of aluminum trichloride contained within the vessel 16 by way of the conduit 72, the open valve 86, the conduit 84, the open valve 90 disposed therein, the header 50, the conduit 24 and the open valve 46 disposed therein. Upon exiting the bed of aluminum trichloride within the vessel 16, the resulting saturated titanium tetrachloride solution of aluminum trichloride exits the vessel 16 and flows by way of the conduit 74, the open valve 92 therein, the conduit 58 and the open valve 62 therein to the product outlet header 60 and on to the solution vaporizer apparatus 170. Thus, in the second mode, the flow pattern of the stream of liquid titanium tetrachloride is changed such that it serially flows through the second bed of granular aluminum trichloride contained within the vessel 14 and the third bed of aluminum trichloride contained within the vessel 16. The bed within the vessel 14 was contacted last by the stream of liquid titanium tetrachloride in the previous mode of operation and the bed within the vessel 16 was recharged in the previous mode. The first bed of aluminum trichloride within the vessel 12 from which a major portion of aluminum trichloride was removed by dissolution in the heated stream of liquid titanium tetrachloride in the first mode of operation is recharged in the second mode. That is, in the second mode of operation and as shown in FIG. 3 by dotted lines, the sludge is first removed from the vessel 12 by circulating a side stream of the saturated liquid titanium tetrachloride contained therein through the flush tank 160. That is, the side stream flows from the vessel 12 by way of the conduit 146, the open valve 152 contained therein, the header 144 and the conduit 158 into the flush tank 160 wherein sludge is separated therefrom. Substantially clean liquid titanium tetrachloride is withdrawn from the flush tank 160 by way of the conduit 166 and pumped back to the vessel 12 by the pump 126 by way of the conduit 128, the header 130, the conduit 132 and the open valve 138 therein. Upon completion of the sludge removal phase and as shown by dashed lines, pressurized nitrogen gas flows by way of the inlet conduit 110, the header 112, the conduit 114 and the open valve 120 into the vessel 12 whereby it displaces saturated liquid titanium tetrachloride therein into the header 60 by way of the conduit 20, the open valve 38, the header 50, the open valve 52 disposed therein, the conduit 76 and the open valves 82 and 80 therein. As before, the pump 26 is at least partially bypassed and returned to normal simultaneously with the start and stop of the flow of displaced saturated liquid titanium tetrachloride into the header 60. Alternately, the displaced liquid titanium tetrachloride can be caused to flow into and through the two other vessels by way of the conduit 20 and open valve 40.

After draining, the bed within the vessel 12 is filled with fresh granular aluminum trichloride from the storage tank 94 by way of the conveyor 96, the rotary valve 98 and the conduit 104. Upon being filled with fresh aluminum trichloride, the vessel 12 is refilled with titanium tetrachloride by increasing the flow rate from the pump 26 and opening the valve 52 whereby a side stream flows into the vessel 12 until it is filled. Nitrogen containing titanium tetrachloride vapor is displaced from the vessel 12 by way of the conduit 115, the open valve 121 therein, the header 127 and the conduit 129. Upon being filled with liquid titanium tetrachloride, the vessel 12, the bed of granular aluminum trichloride and the liquid titanium tetrachloride are heated to the desired temperature as described above.

Referring now to FIG. 4, the third mode of operation of the system 10 is illustrated. In the third mode, the flow pattern of the heated stream of liquid titanium tetrachloride is changed whereby the stream flows from the inlet header 18 to the bed of granular aluminum trichloride within the vessel 16 by way of the conduit 24 and the open valves 48 and 46 therein. After contacting the bed of aluminum trichloride within the flows by way of the conduit 74, the open valve 92 therein, the conduit 58 and the open valve 64 therein, the conduit 66 and the open valve 68 therein, the header 50 and the open valve 52 therein, the conduit 20 and the open valve 38 therein into the vessel 12. After flowing through the bed of aluminum trichloride therein, the resulting saturated titanium tetrachloride solution of aluminum trichloride exits the vessel 12 by way of the conduit 70, the open valve 78, the conduit 76 and the open valve 80 into the outlet product header 60. From the header 60, the saturated solution is conducted to the solution vaporizer apparatus 170. Thus, in the third mode of operation, the heated stream of titanium tetrachloride serially contacts the bed of aluminum trichloride within the vessel 16 followed by the bed of aluminum trichloride within the vessel 12. The bed within the vessel 16 was contacted last by the stream of liquid titanium tetrachloride in the previous mode and the bed within the vessel 12 was recharged in the previous mode.

The bed of aluminum trichloride within the vessel 14 from which a major portion of aluminum trichloride was removed by dissolution in the heated stream of liquid titanium tetrachloride in the previous mode of operation is recharged as previously described. That is, sludge is removed from the vessel 14 by pumping a side stream of the saturated liquid titanium tetrachloride therein to the flush tank 160 by way of the conduit 148, the open valve 154 therein, the header 144 and the conduit 158 and from the tank 160 by way of the conduit 166, the pump 126, the conduit 128, the header 130, the conduit 134 and the open valve 140 therein. After the sludge has been removed, the vessel 14 is drained by flowing pressurized nitrogen gas into the vessel 14 by way of the conduit 110, the header 112, the conduit 116 and the open valve 122 therein. Displaced saturated liquid titanium tetrachloride is removed from the vessel 14 by way of the conduit 22, the open valve 42 therein, the header 50, the open valve 54 therein, the conduit 84 and the open valves 90 and 88 therein. Alternately, the displaced liquid titanium tetrachloride can be caused to flow into and through the other two vessels by way of the conduit 22 and the open valve 44 therein. As before, the pump 26 is at least partially bypassed and then returned to normal simultaneously with the start and stop of the flow of saturated liquid titanium tetrachloride displaced from the vessel 14.

Upon completion of the draining phase, the bed within the vessel 14 is filled with fresh granular aluminum trichloride from the storage vessel 94 by way of the conveyor 96, the rotary valve 100 and the conduit 106. The vessel is then filled with liquid titanium tetrachloride by increasing the flow rate of the stream of liquid titanium tetrachloride pumped by the pump 26 and opening the valve 54. The displaced nitrogen containing titanium tetrachloride vapor flows by way of the conduit 117, the open valve 123, the header 127 and the conduit 129 to the nitrogen vent system. Following filling, the vessel 14 is heated as described above.

When a major portion of aluminum trichloride has been removed from the bed within the vessel 16 by dissolution in the heated stream of liquid titanium tetrachloride flowing therethrough, the flow pattern of the heated stream of liquid titanium tetrachloride is again changed so that the first mode of operation as illustrated in FIG. 2 is duplicated and repeated. Thereafter, the flow pattern of the heated stream of liquid titanium tetrachloride is changed each time a major portion of the granular aluminum trichloride has been removed from the bed being contacted first by the heated stream of liquid titanium tetrachloride. The change in the flow pattern results in the heated stream of liquid titanium tetrachloride serially flowing into contact with the bed of granular aluminum trichloride previously contacted last and then into contact with the bed of granular aluminum trichloride just recharged. The bed from which a major portion of the granular aluminum trichloride has previously been dissolved is removed from contact with the heated stream of liquid titanium tetrachloride and it is recharged as described above.

In order to present a clear understanding of the bed and switching valve sequence of the system 10, such sequence is shown in Table I for the first three modes of operation, one complete cycle.

matically. If the valve control is automatic, any conventional hydraulic, pneumatic or electric operated valves can be used in conjunction with conventional instruments and controllers.

In order to further illustrate the process of the invention, the following example is given.

EXAMPLE

A 60,000 lbs. per hour stream of liquid titanium tetrachloride is pumped by the pump 26. The stream is discharged from the pump at a temperature of about 40° C. and a pressure of about 40 psig. While flowing through the heater 36, the temperature of the stream is raised to about 108° C. whereby upon saturation with aluminum trichloride, the stream will have dissolved therein about 1.0% aluminum trichloride by weight of the solution.

The vessels 12, 14 and 16 are glass lined steel vessels equipped with steam jackets, conical bottoms and means for retaining beds of granular aluminum trichloride therein as well as for distributing bottom fed incoming liquid titanium tetrachloride throughout the beds. 6000 lbs. of granular aluminum trichloride having

TABLE I

| Beds<br>First Bed (Vessel 12)<br>Second Bed (Vessel 14)<br>Third Bed (Vessel 16)<br>Switching Valves | AlCl₃ Bed and Switching Valve Sequence | | |
|---|---|---|---|
| | MODE 1<br>Dissolving First<br>Dissolving Second<br>Recharging | MODE 2<br>Recharging<br>Dissolving First<br>Dissolving Second | MODE 3<br>Dissolving Second<br>Recharging<br>Dissolving First |
| 34 | o-c[1] | o-c | o-c |
| 38 | o[2] | o-c | o |
| 40 | o | c | c |
| 42 | o | o | o-c |
| 44 | c[3] | o | c |
| 46 | o-c | o | o |
| 48 | c | c | o |
| 52 | c | o-c | o |
| 54 | c | c | o-c |
| 56 | o-c | c | c |
| 62 | o-c | o | c |
| 64 | o-c | c | o |
| 68 | c | c | o |
| 78 | o | c | o |
| 80 | c | o-c | o |
| 82 | o | o-c | c |
| 86 | o | o | c |
| 88 | o | c | o-c |
| 90 | c | o | o-c |
| 92 | c | o | o |
| 98 | c | o-c | c |
| 100 | c | c | o-c |
| 102 | o-c | c | c |
| 120 | c | o-c | c |
| 121 | c | c | o-c |
| 122 | c | c | o-c |
| 123 | o-c | c | c |
| 124 | o-c | c | c |
| 125 | c | o-c | c |
| 138 | c | o-c | c |
| 140 | c | c | o |
| 142 | o-c | c | c |
| 152 | c | o-c | c |
| 154 | c | c | o |
| 156 | o-c | c | c |
| 164 | o-c | o-c | o-c |

[1] o-c = Opened and Closed During Recharging
[2] o = Open
[3] c = Closed

As will be understood by those skilled in the art, any number of beds of aluminum trichloride can be utilized in carrying out the improved process of the present invention and a variety of systems and arrangements of apparatus for recharging the beds may be used. Further, the switching valves may be 2-way or 3-way or combinations thereof and may be controlled manually or autoa particle size in the range of from about 4 mesh to about 16 mesh are contained in each of the vessels whereby cylindrical beds of aluminum trichloride are formed approximately 3 feed in diameter by 11 feet high.

A 60,600 lbs. per hour stream of titanium tetrachloride solution containing aluminum trichloride in an amount of about 1% by weight of solution is continually produced and conducted to the solution vaporizer apparatus 170. While flowing through the vaporizer apparatus 170, the solution is converted to a vapor mixture which is conducted by the conduit 172 to the vapor oxidizer apparatus 174 wherein the vapor mixture is converted to 25,000 lbs. per hour of rutile titanium dioxide containing 1.0% by weight aluminum oxide.

The mode of operation and flow pattern of the heated stream of liquid titanium tetrachloride is changed every 24 hours during which time 250 lbs. per hour of aluminum trichloride is removed from the first bed of the two beds being serially contacted by the heated stream of liquid titanium tetrachloride and 20 lbs. per hour of aluminum trichloride are removed from the second of such beds. The depleted first of the two serially contacted beds in the previous mode of operation is recharged during each mode by first circulating a 20,000 lbs. per hour side stream of saturated titanium tetrachloride solution through the flush tank 160 for a period of time of about ½ hour. Approximately 60 lbs. of sludge are removed from the recharged vessel and conducted to sludge disposal.

The vessel to be recharged is pressurized to about 5 psig above the pump 26 discharge pressure. Displaced liquid passes through the remaining beds and into the vaporizer at a rate controlled by a level controller in the vaporizer.

After draining, the bed being recharged is filled with 5400 lbs. of granular aluminum trichloride, and the vessel is refilled with liquid titanium tetrachloride by increasing the flow rate produced by the pump 26 and routing a side stream into the vessel while venting nitrogen therefrom. Finally, the vessel, the refilled bed of aluminum trichloride and the liquid titanium tetrachloride contained therein are all heated by means of steam jacketing on the vessel to a temperature of about 108° C.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A process for producing a stream of titanium tetrachloride solution containing a ratio of aluminum trichloride to titanium tetrachloride dissolved therein and maintained sufficiently constant to obtain a titanium dioxide product of uniform quality and which retains said ratio of aluminum trichloride to titanium tetrachloride when said stream is vaporized comprising the steps of:

(a) heating a stream consisting essentially of liquid titanium tetrachloride to a temperature sufficient to dissolve said aluminum trichloride to form a saturated solution thereof to yield a solution characterized by said ratio of aluminum trichloride to titanium tetrachloride when said stream consisting essentially of liquid titanium tetrachloride is subsequently contacted with said aluminum trichloride;

(b) flowing said heated stream of titanium tetrachloride through a pump to bring said heated stream of titanium tetrachloride into contact with at least one bed of granular aluminum trichloride whereby aluminum trichloride is dissolved in said titanium tetrachloride to saturation and a stream of titanium tetrachloride solution containing said ratio of aluminum trichloride to titanium tetrachloride is produced so that said titanium tetrachloride solution containing said ratio of aluminum trichloride to titanium tetrachloride is not flowed through said pump to avoid corrosion of said pump;

(c) recharging a depleted bed of solid aluminum trichloride from which a major portion of aluminum trichloride has previously been removed by dissolution in said heated stream of liquid titanium tetrachloride and which is no longer in contact with said stream by draining liquid titanium tetrachloride from said bed, filling said bed with fresh granular aluminum trichloride, refilling said bed with liquid titanium tetrachloride and preheating said bed;

(d) changing a flow pattern of said heated stream of titanium tetrachloride when said bed of granular aluminum trichloride in contact with said heated stream of titanium tetrachloride is depleted by the removal of a major portion of said bed by dissolution in said heated stream of liquid titanium tetrachloride so that said heated stream of liquid titanium tetrachloride flows into contact with said recharged bed of granular aluminum trichloride and said depleted bed is no longer in contact with said stream and is recharged; and (e) thereafter changing the flow pattern of said heated stream of liquid titanium tetrachloride so that said stream flows into contact with the bed of granular aluminum trichloride just recharged, and so that the depleted bed from which a major portion of said granular aluminum trichloride has just been removed by dissolution is no longer in contact with said stream and is recharged.

2. The process of claim 1 wherein said liquid stream of titanium tetrachloride is heated to a temperature in a range of from about 95° C. to about 130° C. and said stream of titanium tetrachloride solution contains aluminum trichloride in an amount in a range of from about 0.4% to about 4.0% by weight of the solution.

3. The process of claim 1 wherein the recharging of said depleted bed of step c is further characterized by the presence of sludge and in accordance with step c the process is further characterized to include the step of removing the sludge from said bed prior to filling said bed with fresh aluminum trichloride.

4. The process of claim 3 wherein said sludge is removed by flushing said bed with a side stream of liquid titanium tetrachloride and separating sludge from said side stream.

5. The process of claim 1 wherein said stream if titanium tetrachloride containing said ratio of aluminum trichloride to titanium tetrachloride is conducted to a vaporizer directly without any further processing step.

6. The process of claim 5 wherein the draining of liquid titanium tetrachloride from said bed being recharged comprises displacing said liquid titanium tetrachloride from said bed with pressurized nitrogen gas and conducting the displaced liquid titanium tetrachloride to said vaporizer.

7. The process of claim 6 which is further characterized to include the step of reducing the flow of said stream of titanium tetrachloride solution containing aluminum trichloride produced in step b during a time the liquid titanium tetrachloride is displaced to said vaporizer from said bed being recharged.

8. The process of claim 1 which is further characterized to include the step of pumping said stream of liquid titanium tetrachloride prior to heating said stream of liquid titanium tetrachloride.

9. The process of claim 1 wherein said stream consisting essentially of liquid titanium tetrachloride is a single stream.

10. A process for producing a vaporized stream of titanium tetrachloride containing a ratio of aluminum trichloride to titanium tetrachloride dissolved therein and maintained sufficiently constant to obtain a titanium dioxide product of uniform quality comprising the steps of:

a pumping a stream consisting essentially of liquid titanium tetrachloride through a pump from a source thereof;

b heating said stream of liquid titanium tetrachloride to a temperature sufficient to dissolved said aluminum trichloride to form a saturated solution thereof to yield a solution characterized by said ratio of aluminum trichloride to titanium tetrachloride when said stream of liquid titanium tetrachloride is subsequently contacted with said aluminum trichloride;

c serially flowing said heated stream of titanium tetrachloride into contact with first and second beds of granular aluminum trichloride whereby aluminum trichloride is dissolved in said titanium tetrachloride to saturation and a stream of titanium tetrachloride solution containing said ratio of aluminum trichloride to titanium tetrachloride is produced and so that said stream of titanium tetrachloride solution containing said ratio of aluminum trichloride to titanium tetrachloride is not flowed through said pump to avoid corrosion of said pump;

d recharging a third depleted bed of aluminum trichloride from which a major portion of aluminum trichloride has previously been removed by dissolution in said heated stream of liquid titanium tetrachloride and which is no longer in contact with said stream by draining liquid titanium tetrachloride from said bed, filling said bed with fresh granular aluminum trichloride, refilling said bed with liquid titanium tetrachloride and preheating said bed;

e changing a flow pattern of said heated liquid stream of titanium tetrachloride when a major portion of said first bed of granular aluminum trichloride has been removed by dissolution in said heated stream of liquid titanium tetrachloride so that said heated stream of liquid titanium tetrachloride serially flows into contact with said second and third beds of granular aluminum trichloride and said first depleted bed is no longer in contact with said stream and is recharged;

f thereafter changing the flow pattern of said heated stream of liquid titanium tetrachloride so that said stream serially flows into contact with the bed of granular aluminum trichloride previously contacted last by said stream and then into contact with the bed of granular aluminum trichloride just recharged, and so that the depleted bed from which a major portion of said granular aluminum trichloride has just been removed by dissolution is no longer in contact with said stream and is recharged; and g after step c direction flowing said stream of titanium tetrachloride solution containing said ratio of aluminum trichloride to titanium tetrachloride without subjecting said titanium tetrachloride solution to any intermediate processing steps to a vaporizer to produce a vapor stream containing said ratio of aluminum trichloride to titanium tetrachloride therefrom.

11. The process of claim 10 wherein the pumping in accordance with step a raises a pressure of said stream of liquid titanium tetrachloride to a level in a range of from about 20 psig to about 40 psig.

12. The process of claim 11 wherein said liquid stream consisting essentially of titanium tetrachloride is heated to a temperature in a range of from about 95° C. to about 130° C. and said stream of titanium tetrachloride solution contains aluminum trichloride in an amount in a range of from about 0.4% to about 4.0% by weight of the solution.

13. The process of claim 11 wherein said liquid stream consisting essentially of titanium tetrachloride is heated to a temperature of about 108° C. and said stream of titanium tetrachloride solution contains aluminum trichloride in an amount of about 1% by weight of the solution.

14. The process of claim 13 wherein the recharging of said depleted bed of step c is further characterized by the presence of sludge and in accordance with step c the process is further characterized to include the step of removing the sludge from said bed prior to filling said bed with fresh aluminum trichloride.

15. The process of claim 14 wherein said sludge is removed by flushing said bed with a side stream of liquid titanium tetrachloride and separating sludge from said side stream.

16. The process of claim 15 wherein said draining of said bed being recharged comprises displacing said liquid titanium tetrachloride from said bed with pressurized nitrogen gas and conducting the displaced liquid titanium tetrachloride to said vaporizer.

17. The process of claim 16 which is further characterized to include the step of reducing the flow of said stream of titanium tetrachloride solution containing said ratio of aluminum trichloride to titanium tetrachloride produced in step b during a time the liquid titanium tetrachloride is displaced to said vaporizer from said bed being recharged.

18. The process of claim 17 wherein said bed being recharged is refilled with liquid titanium tetrachloride by flowing a portion of said pumped and heated stream of liquid titanium tetrachloride to said bed.

19. The process of claim 18 wherein said bed being recharged is preheated by indirect heat exchange with a heating medium.

20. The process of claim 19 wherein said heating medium is steam.

21. The process of claim 20 wherein said vapor stream containing said ratio of aluminum trichloride to titanium tetrachloride is conducted to an oxidizer wherein rutile titanium dioxide is produced therefrom.

22. The process of claim 10 wherein said stream consisting essentially of liquid titanium tetrachloride is a single stream.

* * * * *